United States Patent
Wakabayashi et al.

(10) Patent No.: US 6,774,215 B2
(45) Date of Patent: Aug. 10, 2004

(54) METHOD OF SEPARATING AND PRODUCING A LIPID RICH-LIPID/PROTEIN COMPLEX AND NATIVE PROTEINS FROM OIL SEEDS

(75) Inventors: Makoto Wakabayashi, Chiba (JP); Satoshi Suzuki, Chiba (JP); Kentaro Kawamura, Chiba (JP); Hiroshi Okada, Chiba (JP); Koji Mitsuki, Chiba (JP)

(73) Assignee: Ajinomoto Co., Inc., Tokyo (JP)

( * ) Notice: Subject to any disclaimer, the term of this patent is extended or adjusted under 35 U.S.C. 154(b) by 535 days.

(21) Appl. No.: 09/093,771

(22) Filed: Jun. 9, 1998

(65) Prior Publication Data

US 2002/0009460 A1 Jan. 24, 2002

(30) Foreign Application Priority Data

Jun. 9, 1997 (JP) ............................................. 9-164911
Dec. 19, 1997 (JP) ............................................. 9-364304

(51) Int. Cl.$^7$ ................................................ C07K 1/00
(52) U.S. Cl. ...................................... 530/359; 530/377
(58) Field of Search ................................. 530/359, 377; 424/193.1, 195.1

(56) References Cited

U.S. PATENT DOCUMENTS

| 2,928,821 | A | * | 3/1960 | Chayen | 530/359 |
| 4,697,004 | A | * | 9/1987 | Puski et al. | 530/378 |
| 5,658,714 | A | * | 8/1997 | Westfall et al. | 530/378 |
| 5,670,624 | A | * | 9/1997 | Yoshimura et al. | 530/350 |

FOREIGN PATENT DOCUMENTS

JP  5-59390  3/1993

* cited by examiner

Primary Examiner—James O. Wilson
Assistant Examiner—Everett White
(74) Attorney, Agent, or Firm—Oblon, Spivak, McClelland, Maier & Neustadt, P.C.

(57) ABSTRACT

A method of producing separated lipid-rich lipid/protein complex and native proteins from oil seeds, by adding a substance having the ability to aggregate lipids with proteins to a water extract of oil seeds, sedimenting or floating a lipid/protein complex having a lipid content of 45% or more as an aggregate, and recovering it for separation from native proteins.

13 Claims, No Drawings

US 6,774,215 B2

METHOD OF SEPARATING AND PRODUCING A LIPID RICH-LIPID/PROTEIN COMPLEX AND NATIVE PROTEINS FROM OIL SEEDS

BACKGROUND OF THE INVENTION

1. Field of the Invention

The present invention relates to a method of producing a separated lipid/protein complex having a lipid content of 45% or more, i.e., a lipid-rich lipid/protein complex, and native proteins, from oil seeds and, more particularly, to a method of efficiently separating and producing lipid-rich lipid/protein complex and native proteins from oil seeds in a manner different from methods of producing lipids by conventional organic solvent extraction or enzymatic lipid extraction.

2. Discussion of the Background

In addition to the method of extraction with organic solvents such as hexane (the solvent extraction method) and the pressing method for producing lipids from oil seeds, a method (the enzymatic method) of extracting lipids by enzymatically macerating tissues of oil seeds has also been evaluated as an environmentally friendly method.

However, the solvent extraction method requires extraction facilities in order to use organic solvents as well as facilities for completely removing the solvent remaining in crude lipid and protein fractions after solvent extraction, and a large amount of initial investment is therefore required. Further, the loss of the solvent during the extraction operation is inevitable, and what is more, it is highly possible for the organic solvent to be released into the atmosphere. Recently, it has been reported that the released solvent lead to destruction of the ozone layer.

In the compressing method for the recovery of lipid from lipid-rich olive (Japanese Unexamined Patent Publication No. 5-59390) as a starting material, the enzymatic method has recently been proposed and put to practical use.

However, the lipids such as in olive, coconut oil etc. occurring in the middle pericarp are significantly different in the state of their presence from lipids occurring in oil seeds such as soybeans, rapeseeds, sunflower, sesame seeds, etc. That is, lipids such as in olives are present as free neutral lipids in its middle pericarp, while neutral lipids in the oil seeds are present in an organelle called an "oil body" including fine particles of neutral lipids covered with phospholipids and a basic protein known as "oleosin".

Accordingly, if the enzymatic method is used, neutral lipids such as contained in the middle pericap of olives can be easily extracted. However, when lipids present as storage lipids in the organelle called "oil body" are enzymatically extracted, the lipids easily form an emulsion with neutral lipids, phospholipids, basic protein and a lot of storage protein as well as with partially digested materials thereof, and the oil layer is very difficult to separate from the composition containing such an emulsion once formed. That is, fractions such as an oil layer, emulsion layer, aqueous layer and residue, each having slightly different specific gravity, are very difficult to separate by centrifugation from the composition consisting of the fractions.

In separating and producing storage proteins such as soybean storage proteins useful as food materials from oil seeds such as soybeans etc., it is generally necessary that soybean neutral lipids are first extracted by the organic solvent method and then the solvent present in the defatted soybeans is removed under reduced pressure or by heating. "Soybean protein isolates" are produced as food material by water-extraction of soybean protein from the resulting defatted soybeans and then drying its isoelectric precipitate. However, this protein has undergone denaturation with organic solvent and has been subjected to the heating and drying steps, and thus its partial denaturation is inevitable.

SUMMARY OF THE INVENTION

The object of the present invention is to efficiently and cheaply provide a lipid-rich lipid/protein complex having superior properties as a neutral lipid as well as native proteins derived from oil seeds using an environmentally friendly and industrially facile procedure to overcome the problem and drawbacks of other methods for separating and recovering neutral lipids and proteins from various oil seeds. The lipid-rich lipid/protein complex in the present invention refers to a lipid/protein complex, wherein the neutral lipid content is 45% or more and wherein the lipid/protein ratio by weight in lipid-rich lipid/protein complex is concentrated by 2.0 times or more as a relative ratio, based on the lipid/protein ratio in the oil seeds used as the raw material. Here, the lipid/protein absolute (weight) ratio in the raw material varies depending on the raw material (for example, about 0.5 in soybeans, about 1.8 in rapeseeds, and so on). The lipid/protein ratio in lipid-rich lipid/protein complex recovered is defined as a relative ratio, assuming that the absolute lipid/protein ratio in the raw material is defined to be 1.0.

To experimentally isolate and recovery the above-described "oil body" present in oil seed cells, a method of utilizing an ultracentrifuge is used to take advantage of the slight difference in the specific gravity of each fraction. However, because industrial utilization of this apparatus is difficult, the present inventors examined the industrial method of easily separating and recovering the lipid rich-lipid/protein complex as well as the native proteins by aggregating the "oil body" with a part of storage proteins in oil seeds and sedimenting or floating the resulting aggregates by low-speed centrifugation.

The object of the present invention is to provide a method of separating and producing lipid rich-lipid/protein complex containing considerable quantities of neutral lipids of superior quality and native proteins, from oil seeds.

Accordingly, the objects of the present invention, and others, may be accomplished with a method of separating and producing a lipid-rich lipid/protein complex and native proteins from oil seeds, by:

adding a substance having an ability to aggregate lipids with proteins to a water extract of oil seeds which contains lipids and proteins native to the oil seeds, to produce a sedimenting or floating lipid-rich lipid/protein complex, where the lipid content of the complex is at least 45% per aggregate;

isolating the complex; and isolating the native proteins.

Thus, the present invention is a method of separating and recovering lipid rich-lipid/protein complex and native proteins from oil seeds, which comprises adding a substance having an ability to aggregate lipids with a part of proteins, sedimenting or floating the resulting lipid rich-lipid/protein complex as an aggregate including a lipid content of 45% or more and being concentrated by 2.0 or more by weight in terms of relative lipid/protein ratio based on that of the raw material, and recovering it for separation from native proteins.

A more complete appreciation of the invention and many of the attendant advantages thereof will be readily obtained

DETAILED DESCRIPTION OF THE INVENTION

As described above, commercial enzymes for the maceration of tissues of oil seeds used to extract lipids from the oil seeds by the enzymatic method may be contaminated with protease activity, so an emulsion is easily formed from basic protein, "oreosin", containing fine neutral lipid particles and storage proteins as well as from partially digested materials thereof, and therefore, respective fractions such as an oil layer, emulsion layer, aqueous layer and residue are very difficult to separate from a composition consisting of such fractions. Therefore, it is not a good approach to start with such enzyme treatment.

In addition, moderate conditions should be selected for heating treatment to keep the "oil body" in an intact form in oil seeds. Further, to facilitate recovery of lipids present in the oil body, the oil seed material is immersed and ground to prepare an unheated water extract, then a suitable aggregating agent and conditions for its use should be selected to form an aggregate of the "oil body" with a part of storage proteins. The unheated water extracts from the oil food material may be a crude extract, and there is no limitation to the extraction conditions.

Under these circumstances, the present inventors estimated that if the content of such aggregated proteins in the raw material of oil seeds can be reduced to half or less upon recovering lipids such as "oil body" by aggregation thereof with a portion of the proteins from the crude water extracts (raw soybean milk) from soybean grains (lipid content: about 20%, soybean protein content: about 35 to 38%) or from hulled and pressed rapeseeds (lipid content: about 40%, protein content: about 20%) or from residues from which lipid was partially extracted by compressing them once by a physical means (lipid content: about 15 to 20%), the isolated and recovered lipid rich-lipid/protein complex can be concentrated at a relative lipid/protein ratio of 2.0 or more by weight based on that of the raw material.

In the present invention, no heating step is required for the water extraction, so the content of lipids and proteins in the residues can be reduced to 10% or less by merely washing the water-extracted residues of the oil seeds 2 or 3 times, and further, native proteins with high qualities can be recovered in high yield from the nonaggregate fraction after recovery of the lipid-rich lipid/protein complex aggregates. Accordingly, these native proteins can be processed and treated arbitrarily depending on the object and can be used in a wide range of applications.

Almost all neutral lipids contained in the lipid-rich lipid/protein complex containing a portion of the storage proteins of oil seeds, obtained by the present invention, are not present as free lipids but are covered with the basic "oleosin" protein and a part of storage proteins and thus hardly undergo an oxidation reaction. Therefore, if the lipid-rich lipid/protein complex is powdered by lyophilization or spray-drying, it is also possible to prevent deterioration of the lipids in the production step and during storage. In this case, simultaneous use of ascorbic acid as a substance having an aggregating ability helps to prevent oxidation of the lipid-rich lipid/protein complex, as well.

A wide variety of oil seeds may be used in the present invention, such as soybeans, rapeseeds, sunflower, sesame seeds, etc. Among these, if oil seeds other than soybeans are used as the raw materials, previous removal of hull therefrom or rough grinding thereof is preferable to improve water absorption and lipid as well as protein yields.

The oil seeds or hulled or roughly ground materials thereof are immersed in water for 6 to 24 hours, preferably overnight, and then the oil seeds or disrupted seeds are ground.

About 5- to 13-fold excess water, preferably about 7- to 10-fold excess water is added for this grinding. Grinding is carried out in a juicer, a grinder such as wet-type grinder, etc.

Then, the ground material is introduced into a solid-liquid separator such as passing-through-type centrifuge to separate it into the unheated crude water extracts and residues. If the raw material is soybeans, the residues correspond to bean curd lees called "okara" at the time of production for "tofu". The residues are washed 1- to 4-times with 3- to 7-fold excess water, preferably 4- to 5-fold excess water. This wash and the above unheated water extracts are combined to give a crude water extract. Although the protein concentration of the crude water extract varies depending on the amount of water added to the immersed raw material, the protein concentration is usually in the range between 0.5 and 6.0% if the amount of water added is within the above-described range.

In preparation of the crude water extracts from the oil seed material, if this extract is preheated under the heating conditions (90 to 95° C., 5 to 10 min.) for the crude ground material, so called "Go", usually prepared in the step for the production of "tofu" from soybeans, the aggregating ability is compromised and the desired lipid-rich lipid/protein complex cannot be obtained. Further, if raw soybean milk is heated at 50° C. for 10 minutes as shown below in Example 10, the aggregating ability is reduced slightly and when heated at 60° C. for 10 minutes, the lipid-rich lipid/protein complex (aggregated) cannot be obtained any more. Accordingly, the allowable range for heating carried out according to necessity is 50° C., preferably 40° C., within 10 minutes, and heating should preferably be limited to this range.

Lipids and proteins are contained in the unheated crude water extracts (e.g., raw soybean milk), and if a substance having an aggregating ability is added thereto, the lipids are aggregated with a portion of the proteins to form a lipid-rich lipid/protein complex. As the substance having an aggregating ability, ascorbic acid, isoascorbic acid, ethylene diamine tetraacetic acid and salts thereof (sodium salts, potassium salts etc.) are also available.

Besides, salts of monovalent ions selected from $Na^+$, $K^+$ and $NH_4^+$, for example, sodium chloride (NaCl), acidic sodium phosphate ($NaH_2PO_4$), sodium sulfate ($Na_2SO_4$), sodium hydrogen carbonate ($NaHCO_3$), potassium chloride (KCl), and ammonium sulfate (($NH_4$)$_2SO_4$), ammonium chloride ($NH_4Cl$) etc., are also useful.

By adding these substances having such an aggregating ability under optimum conditions, it is possible to aggregate the lipid-rich lipid/protein complex, where the content of neutral lipids is usually 45% or more (in terms of dried mass), and wherein the lipid/protein ratio by weight in lipid/protein complex is concentrated by 2.0 or more, as a relative ratio, assuming that the absolute lipid/protein ratio in oil seeds as raw material (0.5 in the case of soybean) is defined to be 1.0.

The optimum amount of the added substance having an aggregating ability is 0.05 to 0.5 M for ascorbic acid or a salt thereof and isoascorbic acid or a salt thereof and 0.02 to 0.05 M for ethylene diamine tetraacetic acid or a salt thereof.

In the case of the above-described salts of monovalent ions, their optimal amount ranges from 0.02 to 0.5 M in terms of molar concentration, depending on the type of salt, and if the final concentration of these salts is expressed in terms of ionic strength, the range from 0.05 to 0.5 is effective for this aggregation reaction.

If NaCl, KCl, NaHCO$_3$ and NH$_4$Cl are added as salts of monovalent ions, these are added at a final concentration of 0.05 to 0.5 M in terms of molar concentration and at an ionic strength of 0.05 to 0.5 respectively and if ((NH$_4$)$_2$SO$_4$), NaH$_2$PO$_4$, and Na$_2$SO$_4$ are added, these are added preferably at a final concentration of 0.02 to 0.15 M in terms of molar concentration and at an ionic strength of 0.06 to 0.45 respectively. It is to be noted that as a matter of course, the above ionic strength is that derived from only the added substance having an aggregating ability and not counting the ionic strength of pH adjustors such as NaOH, KOH, etc.

The optimum pH for aggregation reaction in the case of soybeans as oil seeds should be adjusted in the range of about pH 5.5 to 9.5, preferably 5.5 to 8.5, and in the case of rapeseeds, in the range of about pH 4.5 to 10.0. However, in the case of ascorbic acid or isoascorbic acid, the upper pH limit should be in the vicinity of pH 7.0 to obtain the aggregated complex because not only ions such as sodium ions etc. are partially dissociated, but also these substances themselves seem to have a reducing ability.

If the substance having an aggregating ability is added as described above to the unheated crude water extracts, the aggregates will sediment or float. This aggregate is recovered as the lipid-rich lipid/protein complex, and simultaneously, native proteins can be recovered from the non-aggregated fraction. According to this method, free lipids are hardly observed in the non-aggregated fraction, possibly due to hard release of the lipids.

Whether the aggregates will sediment or float depends on its specific gravity of the medium. For example, when sodium ascorbate is used at a concentration of 0.05 and 0.2 M, the lipid-rich lipid/protein complex will be obtained as a sedimented aggregate, whereas when sodium ascorbate is added at 0.3 M or more, the aggregate will float. If the aggregate is obtained using sodium chloride, the aggregate will be recovered as a sedimented precipitates at a concentration between 0.05 and 0.3 M sodium chloride, while the aggregate will float at a concentration between 0.4 and 0.5 M sodium chloride.

As described above, the lipid/protein ratio by weight in soybeans as the raw material is about 0.5, but when the substance having an aggregating ability is added according to the present invention, the lipid rich-lipid/protein complex is recovered as a sedimented aggregate if its lipid/protein ratio by weight is about 2.0 or less, but if this ratio exceeds 2.2, the lipid content increase, and its specific gravity is also increased, so the aggregate will float upon separation by centrifugation. If the lipid-rich lipid/protein complex is aggregated from rapeseeds inherently having a high oil content (lipid/protein by weight in raw rapeseeds: about 1.8), the resulting lipid rich-lipid/protein complex will have as a high ratio as 6.3 as described below in Example 5, so the aggregate will float in any case. In a very simple step using low-speed centrifugation, the aggregate may be sedimented or floated for separation and recovery.

Although the lipid-rich lipid/protein complex aggregated by adding the substance having an aggregating ability to the unheated crude water extracts (e.g., raw soybean milk) has a lipid content of 45% or more as dry base, the complex is characterized by having relatively low viscosity and being able to be recovered as an aggregate that is easy to handle.

To separate and recover the aggregated lipid-rich lipid/protein complex, it can easily be sedimented or floated for recovery by low-speed centrifugation at 3,000 r.p.m. for about 5 minutes, so it can be separated and recovered from the non-aggregated fraction (aqueous layer) in the industrially very easy operation.

A large number of nutrients, enteric nutrients, etc., containing neutral lipids and proteins have recently been produced. For usual administration, however, these nutrients suffer from inferior tastes because they contain free neutral lipids. On the other hand, the majority of free lipids in the lipid-rich lipid/protein complex obtained by the present invention are covered with proteins, so that in place of the conventional product produced by just mixing neutral lipids and proteins, the complex of the invention can be used particularly in nutrient drinks with improved tastes.

In addition, the lipid-rich lipid/protein complex obtained by the present invention is low in protein levels, so it can also be used as the raw material to separate and recover neutral lipids therefrom.

At present, in only the case where the raw material is soybeans, storage proteins are extracted and separated from defatted soybeans after lipids are extracted and separated by the solvent method. With respect to rapeseeds, sunflower, sesame seeds etc. other than soybeans, however, isolation and utilization of storage proteins contained therein is not practically conducted. According to the present invention, the storage proteins of these oil seeds can be recovered and utilized to provide new applications.

In particular, when soybean grains are used as the oil seeds, soybean proteins with less denaturation can be recovered by a simple method such as isoelectric precipitation from a non-aggregated fraction (aqueous layer) after the lipid rich-lipid/protein complex is separated as an aggregated fraction from an unheated water extract (raw soybean milk). Furthermore, soybean whey protein and soybean oligosaccharides remain in the supernatant from which soybean proteins have been recovered, and highly pure soybean oligosaccharides can be isolated and recovered by separation through membrane, etc., so an environmentally friendly process can also be provided for production of soybean oligosaccharides.

EXAMPLES

Having generally described this invention, a further understanding can be obtained by reference to certain specific examples which are provided herein for purposes of illustration only and are not intended to be limiting unless otherwise specified.

Example 1

100 g of soybean grains were immersed in water at 5° C. for 20 hours and then water was removed therefrom, and 1 L distilled water was added thereto, and they were ground 10 minutes twice in a commercial juicer. This ground material was centrifuged in a passing-through-type centrifuge to which a wood cotton cloth had been attached, and 900 g raw soybean milk was thus recovered. The neutral lipid and protein recovered in this soybean milk were analyzed for their contents by the chloroform-methanol method and the Kjeldahl method, respectively. The results indicated that 60 to 80% of the neutral lipids and proteins in the raw material were recovered respectively in the raw soybean milk.

Subsequently, to 20 ml of this raw soybean milk were added various additives at a concentration in the range between 0.01 and 1 M, and the pH was adjusted in the range between 6 and 7, and an aggregating ability of the lipid/ protein complex was examined. The additive-free raw soybean milk was used as the control. The results are shown in Table 1. The Table shows the amounts of the aggregates (sedimented and floated mass) and the degree of turbidity of the aqueous layer, where "−" is given when absent with respect to aggregation and turbidity, "±" when present in a trace amount, and "+" when present, and a large number of these symbols indicates a large degree of aggregation and high turbidity.

TABLE 1

| Added substance | Presence or absence of aggregate | Turbidity of aqueous layer | Note |
| --- | --- | --- | --- |
| None | − | ++++ | raw soybean milk |
| Na-ascorbate | ++ | ++ | lipid rich-lipid/protein complex was aggregated |
| Na-isoascorbate | ++ | ++ | the same as above |
| Ethylene diamine tetraacetate | ++ | ++ | the same as above |
| Glucone-δ-lactone | ++++ | ± | "tofu"-like sedimented aggregates |
| Na-citrate | − | ++++ | the same as raw soybean milk |
| Mercaptoethanol | − | ++++ | uniform white-milky solution |

As a result, it was found that when sodium ascorbate or sodium isoascorbate was added to the raw soybean milk at a final concentration between 0.05 and 0.5 M or ethylene diamine tetraacetate at a final concentration between 0.02 and 0.05 M, the lipid rich-lipid/protein complex of the present invention can be aggregated.

Example 2

Raw soybean milk was prepared under the same conditions as in Example 1. To 20 ml of the raw soybean milk was added sodium ascorbate at a final concentration of 0 to 0.5 M, and the pH was adjusted in the range of 6.4 to 6.7. After pH adjustment, it was left at room temperature for about 10 minutes and centrifuged at 3000 rpm for 5 minutes in a low-speed centrifuge, and the aggregate was recovered, and simultaneously the lipids contents in the non-aggregates and proteins in the aqueous layer were analyzed. The results are shown in Table 2.

As a result, when sodium ascorbate was added at a concentration in the range between 0.05 and 0.2 M, the pH was about 6.6 and the ratio of lipid to protein in the resulting sedimented aggregates, that is, the relative ratio based on that of the raw material, was the highest assuming that the ratio of lipid to protein (lipid/protein) in the raw material was 1.0. In addition, the majority of lipids were recovered as a floating aggregate in the concentration range between 0.3 and 0.5 M. From these results, it was found that the considerable effect is brought about even at a final concentration in the range between 0.3 and 0.5 M.

In addition, the absolute lipid/protein ratio by weight in the soybean grains was 0.5, but assuming that this value was 1.0, the relative lipid/protein ratio in the lipid rich-lipid/protein complex aggregated at pH 6.6 was found to be 2.0 or more based on that of the raw material, indicating that the lipid content became twice or more.

TABLE 2

| conc. of additives (M) | in aggregated fraction (%) | | in aqueous layer fraction (%) | | relative ratio of lipid/-protein |
| --- | --- | --- | --- | --- | --- |
| | lipid content | protein content | lipid content | protein content | |
| 0 | 0 | 0 | 100 | 100 | 0 |
| 0.05 | 90 | 45 | 10 | 55 | 2.2 |
| 0.1 | 95 | 46 | 4 | 53 | 2.4 |
| 0.2 | 97 | 38 | 2 | 60 | 3.0 |
| 0.3 | 70* | 40* | 17 | 55 | 2.0 |
| 0.5 | 47* | 23* | 50 | 75 | 2.4 |

*Floating aggregates.

Example 3

Under the same conditions as in Example 1, 980 g of raw soybean milk was prepared from 100 g of starting soybeans. The result indicated that the concentration of lipids in the row soybean milk was 1.8% (70% recovery from material), and that the protein concentration was 3.2% (72% recovery).

To 20 ml of this raw soybean milk was added an equal volume of 0.4 M sodium ascorbate solution, then the mixture was adjusted in the range of pH 3.9 to 10.1 with sulfuric acid and caustic soda, and followed by analyzing lipid and protein content in the aggregated fraction and the nonaggregated fraction in the aqueous layer. The final concentration of sodium ascorbate was 0.2 M. The results are shown in Table 3.

As is evident from Table 3, the relative lipid/protein ratio was the highest at pH 6.6. The range of pH 4.8 or less is not preferable because it is just the region in which soybean proteins, that is, all proteins except for whey protein, are sedimented by isoelectric precipitation.

On the other hand, it was assumed that at pH 5.6 and 6.6, a part of soybean storage proteins were aggregated and precipitated with the oil body included therein. At pH 7.6 or more, the content of lipids recovered as the sedimented aggregate is gradually lowered.

TABLE 3

| solution pH | in sedimented aggregate fraction (%) | | in aqueous layer fraction (%) | | relative ratio*[1] |
| --- | --- | --- | --- | --- | --- |
| | lipid content | protein content | lipid content | protein content | |
| 3.9 | 100 | 67 | 0 | 30 | 1.4 |
| 4.8 | 102 | 69 | 0 | 30 | 1.4 |
| 5.6 | 99 | 53 | 2 | 55 | 2.0 |
| 6.6 | 103 | 40 | 0 | 63 | 2.8 |
| 7.6 | 58 | 22 | 40 | 75 | 2.5 |
| 8.3 | 40 | 17 | 60 | 82 | 2.3 |
| 9.0 | 19 | 11 | 95 | 90 | 1.7 |
| 10.1 | 0 | 0 | 96 | 99 | 0.0 |

*[1]Relative lipid/protein ratio in the sedimented aggregate fraction, which is expressed assuming that the lipid/protein ratio (i.e., 0.5) by weight in the soybean grains as the raw material is 1.0.

Comparative Example 1

In Example 3, a comparative test was conducted where the pH value of the raw soybean milk was varied in the range of 4.6 to 10.1 without adding sodium ascorbate. The other conditions were the same as in Example 3. The results are shown in Table 4.

As is evident from the Table, no aggregate was obtained at about pH 6.6. It can therefore be understood that at the same pH value of 6.6, the lipid-rich lipid/protein complex can be precipitated only when sodium ascorbate is added at the optimum concentration (0.05 to 0.2 M).

TABLE 4

| pH | in sedimented aggregate fraction (%) | | in aqueous layer fraction (%) | |
|---|---|---|---|---|
| | lipid content | protein content | lipid content | protein content |
| 4.6 | 99 | 89 | 0 | 12 |
| 5.4 | 98 | 79 | 2 | 21 |
| 6.6 | 0 | 2 | 94 | 99 |
| 7.4 | 0 | 4 | 93 | 96 |
| 9.0 | 0 | 2 | 92 | 90 |
| 10.1 | 0 | 2 | 98 | 96 |

Example 4

One kg of soybean grains (lipid content 21.3%, protein content 35.7%) were immersed in water overnight under the same conditions as in Example 1, then ground, and separated into a bean curd lee fraction and raw soybean milk (1) by a passing-through-type centrifuge to which 2 sheets of cloth had been attached.

Five L distilled water (about 3.5-fold excess water relative to the bean curd lee fraction) was added to the bean curd lee fraction which was then ground again to give a bean curd lee wash (2) in the same manner as above. The total amount of (1) and (2) as the raw soybean milk was 13.5 L.

Thirteen and half L of 0.2 M sodium ascorbate solution was added to this raw soybean milk (the final concentration of sodium ascorbate was 0.1 M), and the mixture was finely adjusted to pH 6.6, left for 30 minutes at room temperature, and separated into a sedimented aggregate and a supernatant by centrifugation at 3000 rpm for 5 minutes in a low-speed centrifuge.

The sedimented aggregate contained 86% of the lipids and 41% of the proteins in the raw material (in terms of recovery from raw material as dry base). The total content (in dried matter) of the lipids and proteins in this sedimented aggregate was 89% and, in addition, 8% sodium ascorbate was included.

Then, the sedimented aggregate was washed with 4 L of 0.1 M sodium ascorbate and then centrifuged at 3000 rpm for 5 minutes to give a washed sedimented aggregate. Thus, 81% of the lipids (as dried matter) and 32% of the proteins (as dried matter) in the raw material were recovered in the sedimented aggregate obtained. The calculated total amount of the lipids and proteins in a lyophilized product from the lipid-rich lipid/protein complex obtained as the sedimented aggregate was 90% in the dried matter, and assuming that the lipid/protein ratio by weight in the raw material was 1.0, the relative lipid/protein ratio in the recovered material was 2.5, indicating that the lipid content was concentrated by twice or more relative to that of the raw material.

Separately, 13.2 L of the supernatant (non-aggregated fraction) from which the sedimented aggregates had been removed by centrifugation was combined with 3.7 L of the wash from the sedimented aggregate. In 16.9 L of the resulting solution, 50% of the proteins in the raw material was recovered, but the oil recovery was as very low as 0.1% or less.

Then, this supernatant was adjusted to pH 4.5 with sulfuric acid and centrifuged, and its protein was sedimented by isoelectric precipitation so that the isoelectric precipitate was recovered. In this protein fraction, 38% of the native proteins in the starting soybeans were recovered.

Example 5

Three L distilled water was added to 300 g of roughly ground rapeseeds (lipid content: 44.15%, protein content: 24.5%) and immersed in water overnight and ground under the same conditions as in Example 4, and separated into a residual fraction and an unheated crude water extracts (1) by a passing-through-type centrifuge having 2 sheets of cloth attached to it. One and half L distilled water was added to the residue which was then ground again to give wash (2) in the same manner as above. These (1) and (2) were combined so that 1.9 L of the crude extracts in total was recovered.

To this crude water extracts was added an equal volume of 0.2 M sodium ascorbate (final concentration of sodium ascorbate: 0.1 M), and the mixture was adjusted to pH 6.6 and then left at room temperature for 30 minutes. Thereafter, it was subjected to low-speed centrifugation at 3000 rpm for 5 minutes so that it was separated into a floating aggregated fraction and a non-aggregated fraction (aqueous layer), and each fraction was recovered.

After the aggregate was lyophilized, 148 g lipid rich-lipid/protein complex was obtained, and 88% of the lipids (as dried matter) and 25% of the proteins (as dried matter) in the raw material were recovered in these aggregates. The lipid/protein ratio by weight in the rapeseeds, as the raw material, was 1.8, while the lipid/protein content by weight in the lipid-rich lipid/protein complex was 6.3, indicating that its lipid content had been concentrated by 3.5-fold (that is, the relative lipid/protein in the lipid-rich lipid/protein complex, based on that of the raw material, was 3.5).

On the other hand, lyophilization of the non-aggregated fraction gave 94 g crude protein fraction, and 60% of the proteins (as dried matter) in the raw material was recovered in this fraction.

Example 6

Raw soybean milk was prepared under the same conditions as in Example 1, and a sodium chloride solution was added to 200 ml of the raw soybean milk at a final concentration between 0.01 and 0.5 M (corresponding to a final ionic strength of 0.01 to 0.5), and the mixture was left at room temperature for 30 minutes and centrifuged at 3000 rpm for minutes to be separated into aggregated and non-aggregated fractions, and each fraction was analyzed for its lipid content and protein content. The results are shown in Table 5.

TABLE 5

| NaCl conc. (M) | in aggregate fraction (%) | | in aqueous layer fraction (%) | | ratio[*2] |
|---|---|---|---|---|---|
| | lipid content | protein content | lipid content | protein content | |
| 0.02 | 43 | 26 | 55 | 74 | 1.7 |
| 0.05 | 96 | 34 | 7 | 62 | 3.0 |
| 0.1 | 104 | 37 | 4 | 57 | 3.0 |
| 0.2 | 96 | 34 | 0 | 61 | 3.0 |
| 0.3 | 100 | 26 | 0 | 87 | 4.0 |
| 0.4 | 71[*1] | 17[*1] | 18 | 72 | 4.4 |
| 0.5 | 46[*1] | 9[*1] | 43 | 91 | 5.2 |

[*1]Recovered as floating aggregates.
[*2]Relative lipid/protein ratio in the aggregates, assuming that the relative lipid/protein ratio in the soybean starting material (absolute ratio was 0.5) was 1.0.

Example 7

200 ml of 0.4 M sodium chloride solution (ionic strength: 0.4) was added to 200 ml of the same raw soybean milk as in Example 6, and the pH of the solution was adjusted in the range between pH 2.5 and 10.0 with sulfuric acid and caustic soda (that is, the mixture was adjusted to the final sodium chloride concentration of 0.2 M, the final ionic strength of 0.2) and the mixture was separated into a sedimented aggregate fraction and a non-aggregate fraction in an aqueous layer, and each fraction was analyzed for its lipid content and protein content. The results are shown in Table 6.

TABLE 6

| solution pH | in aggregate fraction (%) | | in aqueous layer fraction (%) | | ratio*[1] |
|---|---|---|---|---|---|
| | lipid content | protein content | lipid content | protein content | |
| 2.5 | 70 | 42 | 4 | 59 | 1.8 |
| 3.5 | 96 | 70 | 0 | 31 | 1.4 |
| 4.0 | 96 | 78 | 0 | 22 | 1.2 |
| 4.5 | 105 | 76 | 0 | 26 | 1.6 |
| 5.0 | 104 | 70 | 0 | 31 | 1.6 |
| 5.5 | 100 | 48 | 0 | 56 | 2.2 |
| 6.0 | 100 | 41 | 0 | 61 | 2.6 |
| 6.5 | 96 | 33 | 0 | 67 | 3.0 |
| 7.0 | 96 | 31 | 0 | 59 | 3.2 |
| 7.7 | 92 | 33 | 4 | 57 | 3.0 |
| 8.5 | 96 | 28 | 11 | 74 | 3.6 |
| 9.0 | 100 | 28 | 7 | 70 | 3.9 |
| 9.5 | 103 | 26 | 11 | 74 | 4.2 |

*[1]Relative lipid/protein ratio in the aggregates, assuming that the relative lipid/protein ratio in the soybean starting material (absolute ratio was 0.5) was 1.0.

As shown in Table 6, the lipid/protein ratio in the sedimented aggregates is 2.0 or less in the vicinity of the isoelectric point (pI) 3.5 to 5.0 of soybean protein, that is, in the pH ranges for producing "tofu". However, in a wider pH range of pH 5.5 or more, a lipid rich-lipid/protein complex with a lipid/protein ratio of 2.0 or more can be recovered as a sedimented aggregates. From these findings, it is understood that the aggregates with a desired lipid/protein ratio by weight can be obtained by suitably controlling the concentration of the substance having an aggregating ability and by adjusting the pH of a water extract from oil seeds, depending on usages, etc., of the lipid rich-lipid/protein complex.

Example 8

To 200 ml raw soybean milk prepared under the same conditions as in Example 1 was added 200 ml sea water (that is, the resulting solution was 2-fold diluted sea water, about 0.21 M in terms of molar concentration of sodium chloride, about 0.21 in terms of ionic strength, and about 0.26 in terms of the final ionic strength of monovalent ions having an aggregating ability in the sea water) or 200 ml of 2-fold diluted sea water (that is, the resulting solution was 4-fold diluted sea water, about 0.11 M in terms of molar concentration of sodium chloride, about 0.11 in terms of ionic strength, and about 0.13 in terms of the final ionic strength of monovalent ions having an aggregating ability in the sea water) (in any case, the pH was finely adjusted to about 6.6), and each mixture was left at room temperature for 30 minutes and centrifuged at 3000 rpm for 5 minutes to be separated into an aggregate fraction and a non-aggregate fraction. Each fraction was analyzed for its lipid content and protein content. The results are shown in Table 7.

As is evident from the Table, the relative lipid/protein ratio in the aggregate was 2.0 or more.

TABLE 7

| sea water | in aggregate fraction (%) | | in aqueous layer fraction (%) | | ratio*[1] |
|---|---|---|---|---|---|
| | lipid content | protein content | lipid content | protein content | |
| 2-fold dilution | 107 | 37 | 0 | 63 | 3.0 |
| 4-fold dilution | 103 | 48 | 0 | 46 | 2.0 |

*[1]Relative lipid/protein ratio in the aggregate.

Example 9

Various salts shown in the table below were added at a final ionic strength (final molar concentration, M) to 200 ml raw soybean milk prepared under the same conditions as in Example 1, and the pH value of each mixture was adjusted to about pH 6. 6. Thereafter, each mixture was left at room temperature for 30 minutes and centrifuged at 3000 rpm for 5 minutes to be separated into aggregate and non-aggregate fractions. Each fraction was analyzed for its lipid content and protein content. The results are shown in Table 8.

TABLE 8

| added salts ionic strength (molar conc.) | in aggregate fraction (%) | | in aqueous layer fraction (%) | | ratio*[1] |
|---|---|---|---|---|---|
| | lipid content | protein content | lipid content | protein content | |
| KCl 0.1 (0.1) | 96 | 42 | 0 | 62 | 2.4 |
| $Na_2SO_4$ 0.06 (0.02) | 85 | 28 | 14 | 68 | 3.2 |
| $(NH_4)_2SO_4$ 0.15 (0.05) | 96 | 38 | 3 | 62 | 2.8 |
| $NH_4Cl$ 0.2 (0.2) | 96 | 38 | 3 | 60 | 2.4 |
| $NaHCO_3$ 0.05 (0.05) | 78 | 38 | 18 | 66 | 2.6 |
| $NaH_2PO_4$ 0.28 (0.05) | 93 | 34 | 4 | 68 | 2.8 |
| no addition | 10 | 13 | 90 | 87 | 1.8 |

*[1]Relative lipid/protein ratio in the aggregate.

Example 10

200 ml of a supernatant soybean milk fraction which was obtained by pre-treatment (i.e. heating for 10 minutes at the temperatures shown in the Table below) of raw soybean milk prepared under the same conditions as in Example 1, followed by centrifuging it at 3000 rpm for 5 minutes, was added 200 ml of 0.4 M sodium chloride solution to give a final molar concentration of 0.2 M (final ionic strength: 0.2). Then, it was centrifuged to be separated into aggregate and non-aggregate fractions. Each fraction was analyzed for its lipid content and protein content. The results are shown in Table 9.

TABLE 9

| pre-treatment temp. (° C.) | in aggregate fraction (%) | | in aqueous layer fraction (%) | |
| --- | --- | --- | --- | --- |
| | lipid content | protein content | lipid content | protein content |
| room temp. (no heat-treatment) | 99 | 30 | 0 | 66 |
| 30 | 98 | 26 | 0 | 56 |
| 40 | 104 | 30 | 0 | 74 |
| 50 | 87 | 26 | 0 | 71 |
| 60 | 25 | 9 | 72 | 86 |
| 70 | 0 | 0 | 100 | 100 |
| 80 | 0 | 0 | 98 | 100 |

As is evident from the Table, the ability to form aggregates initiated to slightly disappear upon thermal pretreatment at 50° C. for 10 minutes, and the aggregating ability disappears completely upon thermal pre-treatment at 60° C. for 10 minutes.

Usually, thermal pre-treatment at 90° C. for 5 to 10 minutes is essential in the step of producing "tofu", so this is evidently different from the pre-treatment step of the present invention. For sterilization of soybean milk as the starting material or for inactivation of endogenous enzymes, it is essential to carry out the step in such a range as not to permit the aggregating ability to disappear.

EFFECT OF THE INVENTION

By adding a substance having an aggregating ability to an unheated water extracts of oil seed according to the present invention, a lipid-rich lipid/protein complex containing the aggregates of neutral lipids and at least a portion of storage proteins, and native proteins from a non-aggregate fraction, can be efficiently separated for production. The properties of the lipid-rich lipid/protein complex are excellent in that the undesirable inherent smells or physical properties of lipids therein are reduced. In addition, the proteins can be obtained in a native form, so their new utilities are expected. Further, the lipid rich-lipid/protein complex can be used as the starting material to produce neutral oil, so an environmentally friendly process can be provided for production of neutral oil.

Obviously, numerous modifications and variations of the present invention are possible in light of the above teachings. It is therefore to be understood that within the scope of the appended claims, the invention may be practiced otherwise than as specifically described herein.

This application is based on Japanese Patent Applications 9-164,911 and 9-364,304, filed Jun. 9, 1997 and Dec. 19, 1997, respectively. Both of the Japanese Patent Applications are incorporated herein by reference in their entirety.

What is claimed as new and desired to be secured by Letters Patent of the United States is:

1. A method of separating and isolating a lipid-rich lipid/protein complex from soybeans, comprising:
    adding a substance having the ability to aggregate lipids with proteins selected from the group consisting of sodium chloride, potassium chloride and ammonium chloride in amounts from 0.05 to 0.5 M, to a water extract of soybeans, thereby producing a sedimenting or floating lipid-rich lipid/protein complex,
    wherein the lipid content of the complex is at least 45% per aggregate;
    isolating the sedimenting or floating lipid-rich lipid/protein complex; and wherein the weight ratio of lipid to protein of the isolated complex is at least 2-fold higher than the weight ratio of lipid to protein of the soybeans.

2. The method of claim 1, wherein the substance having an ability to aggregate lipids with proteins further comprises an organic acid.

3. The method of claim 2, wherein the organic acid is ascorbic acid, isoascorbic acid, ethylenediamine tetraacetic acid, or a salt thereof.

4. The method of claim 1, wherein the substance having an ability to aggregate lipids with proteins is added to the water extract of soybeans at a final concentration of 0.05 to 0.5 M in terms of ionic strength.

5. The method of claim 1, wherein the substance having an ability to aggregate lipids with proteins further comprises sodium hydrogen carbonate, and the substance is added to the water extract of soybeans at a final concentration of 0.05 to 0.5 M in terms of ionic strength.

6. The method of claim 1, wherein the substance having an ability to aggregate lipids with proteins further comprises acidic sodium phosphate, sodium sulfate, and the substance is added to the water extract of soybeans at a final concentration of 0.06 to 0.45 in terms of ionic strength.

7. The method of claim 1, wherein the substance having an ability to aggregate lipids with proteins further comprises ascorbic acid, isoascorbic acid, or a salt thereof, and the substance is added to the water extract of soybeans at a final concentration of 0.05 to 0.5 M.

8. The method of claim 1, wherein the substance having an ability to aggregate lipids with proteins further comprises ethylenediamine tetraacetic acid or a salt thereof, and the substance is added to the water extract of soybeans at a final concentration of 0.02 to 0.05 M.

9. The method of claim 1, wherein the adding step is conducted at pH 4.5 to 10.

10. The method of claim 1, wherein the adding step is conducted at pH 5.5 to 9.5.

11. The method of claim 1, wherein the adding step is conducted at pH 5.5 to 8.5.

12. The method of claim 1, further comprising isolating native soybean proteins.

13. The method of claim 1, wherein the pH of the water extract of soybeans is at least 5.5.

* * * * *